March 4, 1969 H. W. LICHTENBERGER ETAL Re. 26,529

METHOD AND APPARATUS FOR DISPENSING VAPORIZABLE LIQUIDS

Original Filed July 6, 1962

INVENTORS
H. WILLIAM LICHTENBERGER
PAUL E. LOVEDAY
BY John C. LeDuc
ATTORNEY

United States Patent Office

Re. 26,529
Reissued Mar. 4, 1969

26,529

METHOD AND APPARATUS FOR DISPENSING VAPORIZABLE LIQUIDS

Horst William Lichtenberger and Paul E. Loveday, Tonawanda, N.Y., assignors to Union Carbide Corporation, a corporation of New York Original No. 3,241,580, dated Mar. 22, 1966, Ser. No. 208,050, July 6, 1962. Application for reissue Aug. 3, 1967, Ser. No. 661,150
U.S. Cl. 141—5 8 Claims
Int. Cl. B65b *31/00, 1/04;* B67c *3/00*

Matter enclosed in heavy brackets [ ] appears in the original patent but forms no part of this reissue specification; matter printed in italics indicates the additions made by reissue.

*ABSTRACT OF THE DISCLOSURE*

*A vaporizable liquid, such as liquid nitrogen, is dispensed on demand from a bank of storage zones by arranging the zones in series with the first zone being communicable with a dispensing outlet, and by transferring liquid from the bottom portion of each succeeding zone to the top portion of each preceding zone such that the first zone in the series is the first to substantially empty and the last zone in the series is the last to substantially empty.*

This invention relates to a system for dispensing a vaporizable liquid from a plurality of storage containers.

Figure 1:
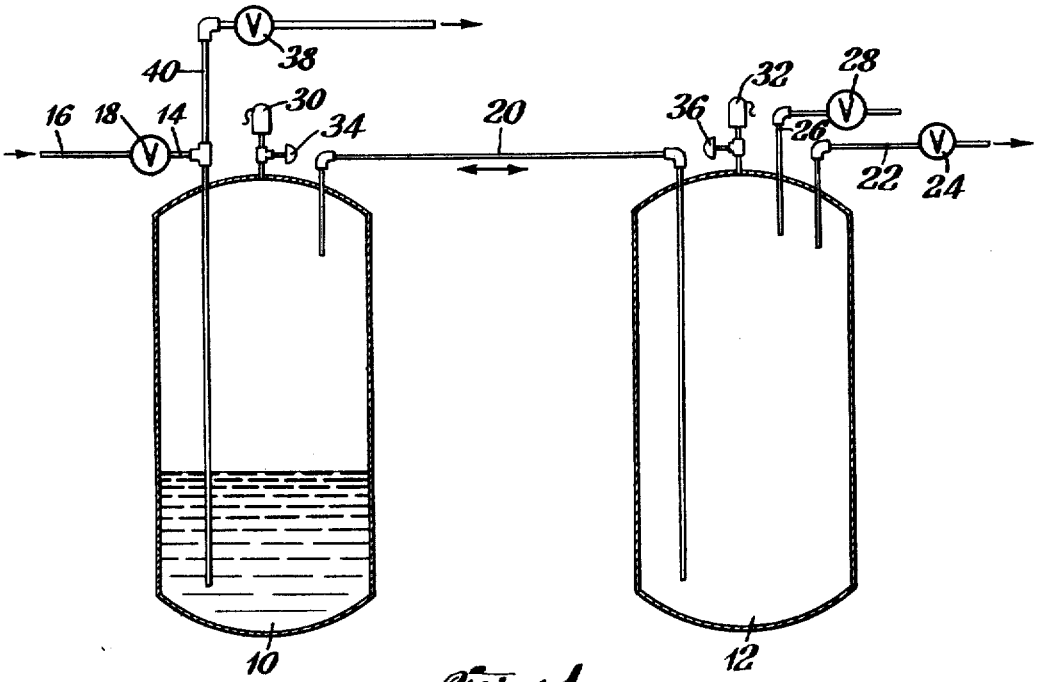
Figure 2:
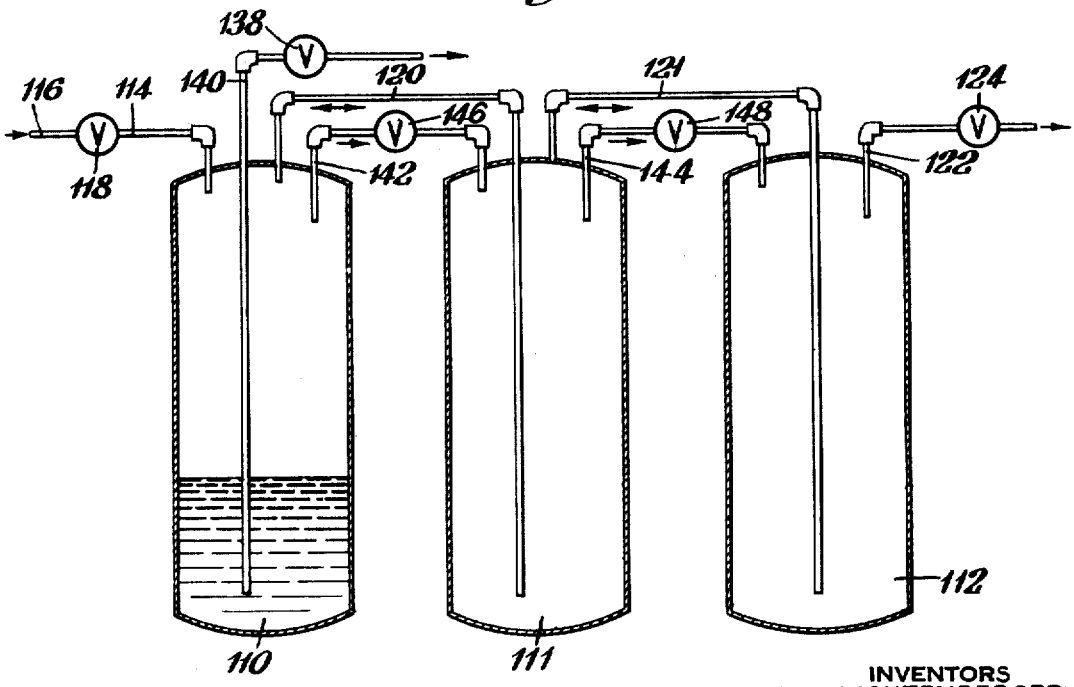

In the in-transit refrigeration of perishable goods in insulated mobile containers using a vaporizable liquid such as liquid nitrogen as the refrigerating means, it has heretofore been difficult to conveniently and adequately store a sufficient amount of refrigerant liquid to permit long distance transportation of large quantities of goods. It is an object of the present invention to provide a vaporizable liquid dispensing system that permits using a plurality of standard size liquid storage containers to permit such long distance hauling of goods. Another object is to provide a system that permits successively filling and emptying a plurality of liquid storage containers such that the need for a manifold arrangement is eliminated. A further object is to provide a vaporizable liquid dispensing system that is simple and convenient to operate. These and other objects and features will be apparent from a consideration of the following description in conjunction with the accompanying drawing in which:

FIGURES 1 and 2 are diagrammatic views of two embodiments illustrating principles of the present invention.

The present invention comprises a system for dispensing a vaporizable liquid such as liquid nitrogen wherein a plurality of liquid storage containers are arranged and interconnected in series relation such that the first container in the series is filled and substantially emptied before succeeding containers. This arrangement further provides that each succeeding container in the series is filled from and emptied through the preceding container. The first container in the series contains the filling and dispensing conduits for the system and the last container in the series contains the vapor vent for the system. In the invention, the bottom portion of each succeeding container in the series communicates with the top portion of the preceding container.

Vaporizable liquid is transferred into the first container of the series from a source thereof and, on filling such container, is then successively transferred through the first container into each succeeding container. After completion of the filling of the last container in the series, liquid transfer from the source is terminated. When demand on the system is made for liquid, liquid is dispensed from the first container of the series, the succeeding containers remaining substantially filled. As the first container is being emptied, liquid is transferred from the next container in the series to the first container and dispensed therefrom with the succeeding containers in the series remaining substantially filled. Thus, each succeeding container in the series is successively emptied through the first container in the order that each one is filled.

To illustrate the sequence of liquid withdrawal from the present system, four 210-liter containers were interconnected in series, each filled with 360 lbs. of liquid nitrogen, and then emptied. After about 1½ hours, the first container in the series was substantially completely emptied and the next (the second) container remained greater than 50% filled. After about 2½ hours, both the first and second containers were substantially completely emptied and the third container was greater than 50% filled. After about 3¼ hours, the first three containers were substantially completely emptied and the last (fourth) container in the series was greater than 50% filled. Finally, after about 5 hours all four containers were substantially completely emptied.

Referring specifically to the FIGURE 1 embodiment of the present invention, two containers 10 and 12, are shown interconnected in series relation in accordance with the above description, container 10 being shown partially filled as it might appear during filling thereof. The first container 10 in the series is filled with a vaporizable liquid, such as liquid nitrogen, through conduit 14 from a liquid source (not shown) connected at 16, valve 18 controlling the flow of liquid thereinto. Any vapor evolved during the filling of container 10 is vented from the top portion of container 10 through conduit 20 into the bottom portion of the succeeding container 12 of the series. This vented vapor cools container 12 and is vented from the top portion thereof through conduit 22 either to another succeeding container or to the atmosphere if container 12 is the last in the series. Valve 24 in conduit 22 is open to permit vapor venting during filling and then closed on termination of the filling.

When container 10 is filled to a predetermined level as determined by the position of the end of conduit 20 therein, liquid is transferred from the top portion of container 10 through conduit 20 into the bottom portion of the succeeding container 12 in the series. On filling container 12, if such container is the last in the series, to a predetermined level as determined by the position of the end of conduit 22 therein, liquid transfer from the source is terminated by closing valve 18. If desired, additional venting means may be provided in the last container in the series by a separate connection 26 containing valve 28. Each of the containers in the series is preferably equipped with separate pressure relief devices such as safety valves 30 and 32 and bursting disks 34 and 36, which are set to maintain adequate pressure to allow dispensing of liquid from the containers.

During periods of no withdrawal, the pressure of the system will tend to reach the pressure of the lowest relief valve setting. If this lowest pressure relief valve was placed in the first container of the series, the succeeding containers would tend to empty into that container and discharge liquid through this relief valve. Therefore, this lowest pressure relief valve must be placed in the last container of the series to avoid wasteful discharge of the product liquid.

To dispense liquid from the system, valve 38 in withdrawal conduit 49 is opened and liquid flows from the first container 10. As the liquid level and pressure within container 10 are reduced, liquid will commence flowing from the bottom portion of container 12 through conduit 20 into the top portion of the preceding container 10.

In order to decrease the fluid pressure drop and thus the time required to fill the system, conduit 14 may terminate in the upper vapor space portion of the first container 10, as shown in FIGURE 2 (item 114). Vapor space liquid filling is usually preferred since the fluid pressure drop is less and therefore the pressure of the liquid source may be less to achieve filling. Whenever vapor space filling is used, a separate withdrawal conduit from the bottom of the first container is required as shown in FIG. 2 at 140. FIGURE 2 also shows separate conduits 142 and 144 connecting the top vapor space portions of the succeeding containers in the series to provide vapor space liquid filling of the succeeding containers to minimize fluid pressure drop.

Interconnecting the top portions of succeeding containers in the series as well as interconnecting the bottom portion of each succeeding container with the top portion of the preceding container provides a further advantage during the filling of the dispensing system shown in FIGURE 2. As liquid is transferred into the top portion of the first container 110 of the series from the liquid source, an initial pressure surge will push vapor successively into each succeeding container through conduits 120 and 121 as well as through conduits 142 and 144 containing check valves 146 and 148. As the liquid continues to fill the first container, the pressure decreases therein due to condensation of vapor by the entering liquid will draw the vented vapor back through conduits 120 and 121 into the first container. Thereafter, when the liquid in the first container rises to the point where it is transferred into the succeeding container 111 through conduit 142, a similar initial pressure surge and subsequent vapor condensation occurrence will take place in succeeding container 111, and so on down to the last container 112 in the series. If necessary to achieve complete filling, vapor may be relieved from the last container through a suitable vapor phase conduit and valve, which may be a pressure-controlling valve.

Liquid dispensing from the system of FIGURE 2 through conduit 140 and valve 138 follows the same procedure as described with reference to FIGURE 1, check valves 146 and 148 in conduits 142 and 144 preventing vapor phase withdrawal from the succeeding containers. Each container is preferably equipped with pressure relief devices similar to FIG. 1, with the relief devices on the last container 112 having the lowest pressure setting.

The systems of FIGURES 1 and 2 may be operated manually or automatically and if automatically, either by electrical or pneumatic means. Further, differential liquid level sensing means may be employed to readily determine the amount of liquid remaining in the dispensing system. Also, if desired, liquid level sensing means may be placed in the last container of the series to control the filling of the system.

In summary, the advantages of the present system are: (1) assurance of complete filling and dispensing of the product liquid; (2) increased flexibility in the amount of the refrigeration capacity in that the number of containers that may be interconnected in series is not fixed; (3) lower investment cost inasmuch as a plurality of standard size liquid storage containers may be used to make up a required capacity vis-a-vis using custom-designed storage containers; and (4) sharing of common equipment such as pressure regulators, liquid level sensing means, and the like.

Although preferred embodiments of the invention have been described in detail, it is contemplated that modifications of the system may be made and that some features may be employed without others, all within the spirit and scope of the invention.

What is claimed is:

1. A method of successively filling a plurality of storage zones with vaporizable liquid from a source thereof, which method comprises:

(a) providing a plurality of such zones in series relation with the first zone in the series being communicable with said source, the bottom and top portions of each succeeding zone in the series being communicable with the top portion of the preceding zone, and the top portion of the last zone in the series being communicable with the atmosphere;

(b) filling the first zone in the series by transferring liquid from said source into the top portion of said first zone and simultaneously venting vapor successively to the bottom portion of each succeeding zone in the series from the top portion of the preceding zone to regulate a momentary pressure surge in said first zone at the beginning of the filling thereof, and subsequently condensing vapor in said first zone by cooling of same during the liquid filling thereof, thereby reducing the pressure therein and causing vented vapor to return to said first zone;

(c) and continuing liquid transfer to said first zone so that liquid successively overflows into each succeeding zone thereby filling each succeeding zone in the series by transferring liquid into the top portion of each such succeeding zone from the top portion of the preceding zone and simultaneously venting vapor successively to the bottom portion of each succeeding zone in the series from the top portion of the preceding zone to regulate a momentary pressure surge within each succeeding zone at the beginning of the liquid filling thereof, and subsequently condensing vapor in each succeeding zone by cooling of same in the series during the liquid filling thereof, thereby reducing the pressure therein and causing vented vapor to return to such zone.

2. A method of dispensing vaporizable liquid from a plurality of storage zones filled *therewith* [from a source thereof], which method comprises:

(a) providing a plurality of such zones in series relation with the first zone in the series being communicable with *a dispensing outlet* [said source], the bottom portion of each succeeding zone in the series being communicable with the top portion of the preceding zone, [and the last zone in the series being communicable with the atmosphere;]

[(b) filling such series of zones through said first zone such that each succeeding zone in the series is filled successively after said first zone;]

[(c)] (*b*) storing the liquid in such zones; and

[(d)] (*c*) dispensing liquid on demand from such series through said first zone such that each succeeding zone in the series is substantially emptied successively after said first zone *solely by vapor pressure derived from the stored liquid.*

3. A method of dispensing vaporizable liquid from a plurality of storage zones filled from a source thereof, which method comprises:

(a) providing a plurality of such zones in series relation with the first zone in the series being communicable with said source, the bottom portion of each succeeding zone in the series being communicable with the top portion of the preceding zone, and the top portion of the last zone in the series being communicable with the atmosphere;

(b) filling the first zone in the series with liquid from said source and simultaneously venting vapor successively to the bottom portion of each succeeding zone in the series from the top portion of the preceding zone to regulate the pressure within said first zone as such zone is being filled;

(c) and continuing liquid transfer to said first zone so that liquid successfully overflows into each succeeding zone thereby filling each succeeding zone in the series with liquid from the top portion of the preceding zone and simultaneously venting vapor successively to the bottom portion of each succeeding zone in the series from the top portion of the preceding zone to regulate the pressure within each succeeding zone as each zone is being filled;

(d) storing the same in such zone; and (e) dispensing liquid on demand from the bottom portion of the first zone of the series and transferring liquid from the bottom portion of each succeeding zone in the series to the top portion of the preceding zone such that the first zone in the series is the first to substantially empty and the last zone in the series is the last to substantially empty.

4. A method of dispensing vaporizable liquid from a plurality of storage zones filled from a source thereof, which method comprises:

(a) providing a plurality of such zones in series relation with the first zone in the series being communicable with said source, the bottom and top portions of each succeeding zone in the series being communicable with the top portion of the preceding zone, and the top portion of the last zone in the series being communicable with the atmosphere;

(b) filling the first zone in the series by transferring liquid from said source into the top portion of said first zone and simultaneously venting vapor successively to the bottom portion of each succeeding zone in the series from the top portion of the preceding zone to regulate a momentary pressure surge in said first zone at the beginning of the filling thereof, and subsequent'y condensing vapor in said first zone by cooling of same during the liquid filling thereof, thereby reducing the pressure therein and causing vented vapor to return to said first zone;

(c) and continuing liquid transfer to said first zone so that liquid successively overflows into each succeeding zone thereby filling each succeeding zone in the series by transferring liquid into the top portion of each such succeeding zone from the top portion of the preceding zone and simultaneously venting vapor successively to the bottom portion of each succeeding zone in the series from the top portion of the preceding zone to regulate a momentary pressure surge within each succeeding zone at the beginning of the filling thereof, and subsequently condensing vapor in each succeeding zone by cooling of same in the series during the liquid filling thereof, thereby reducing the pressure therein and causing vented vapor to return to such zone;

(d) storing the same in such zone; and (e) dispensnig liquid on demand from the bottom portion of the first zone of the series and transferring liquid from the bottom portion of each succeeding zone in the series to the top portion of the preceding zone such that the first zone in the series is the first to substantially empty and the last zone in the series is the last to substantially empty.

5. Apparatus for dispensing a vaporizable liquid which comprises a plurality of storage containers in series relation; means providing fluid communication with the first container in the series for filling and dispensing liquid therefrom; first means providing fluid communication between the bottom portion of each succeeding container and the top portion of the preceding container for transferring liquid from each succeeding container in the series to the preceding container, said first means comprising a plurality of conduits each extending from the bottom portion of a succeeding container to the top portion of the immediately preceding container; second means providing fluid communication between the top portion of each succeeding container and the top portion of the preceding container for transferring vapor to each succeeding container in the series from the preceding container, said second means comprising a plurality of conduits each extending from the top portion of a succeeding container to the top portion of the immediately preceding container, said first and second means being arranged such that said storage containers are only serially interconnected in fluid communication; and means providing fluid communication between the top portion of the last container in the series and the atmosphere for venting vapor from the series of containers to regulate the pressure therein.

*6. A method of dispensing vaporizable liquid from a plurality of storage zones filled therewith, which method comprises:*

*(a) providing a plurality of such zones in series relation with the first zone in the series being communicable with a dispensing outlet, the bottom and top portions of each succeeding zone in the series being communicable with the top portion of the preceding zone;*

*(b) storing the same in such zone; and*

*(c) dispensing liquid on demand from the bottom portion of the first zone of the series and transferring liquid from the bottom portion of each succeeding zone, in the series to the top portion of the preceding zone such that the first zone in the series is the first to substantially empty and the last zone in the series is the last to substantially empty solely by vapor pressure derived from the stored liquid.*

*7. A method of dispensing vaporizable liquid nitrogen from a plurality of storage zones filled therewith, which method comprises:*

*(a) providing a plurality of storage zones in series relation with the first zone in the series being communicable with a dispensing outlet, the bottom and top portion of each succeeding zone in the series being communicable with the top portion of the preceding zone;*

*(b) storing the vaporizable liquid nitrogen in such zones; and*

*(c) dispensing liquid nitrogen on demand from the bottom portion of the first zone of the series and transferring liquid from the bottom portion of each succeeding zone such that the first zone in the series is the first to substantially empty and the last zone in the series is the last to substantially empty, the liquid nitrogen being dispensed from said first zone and transferred from each succeeding zone solely by vapor pressure in the top portion of each zone derived from the stored vaporizable liquid nitrogen.*

*8. A method as claimed in claim 7 further including the step of maintaining the pressure in the last zone of the series lower than the pressure in the remaining zones.*

References Cited

The following references, cited by the Examiner, are of record in the patented file of this patent or the original patent.

UNITED STATES PATENTS

| | | | |
|---|---|---|---|
| 2,729,948 | 1/1956 | Northgraves | 62—51 |
| 2,979,232 | 4/1961 | Wood | 222—129.1 |

FOREIGN PATENTS

| | | |
|---|---|---|
| 305,838 | 6/1918 | Germany. |

LAVERNE D. GEIGER, *Primary Examiner.*

E. J. EARLS, *Assistant Examiner.*

U.S. Cl. X.R.

141—35; 222—1; 137—575